(12) United States Patent
Shi et al.

(10) Patent No.: US 11,901,823 B2
(45) Date of Patent: Feb. 13, 2024

(54) SYSTEMS AND METHODS FOR LOAD LINE REGULATION OF SIGMA CONVERTERS

(71) Applicant: AcLeap Power Inc., Taipei (TW)

(72) Inventors: Yuxiang Shi, Cary, NC (US); Jing Xu, Cary, NC (US); Utkarsh Raheja, Raleigh, NC (US)

(73) Assignee: AcLeap Power Inc., Taipei (TW)

( * ) Notice: Subject to any disclaimer, the term of this patent is extended or adjusted under 35 U.S.C. 154(b) by 59 days.

(21) Appl. No.: 17/535,341

(22) Filed: Nov. 24, 2021

(65) Prior Publication Data

US 2023/0163691 A1    May 25, 2023

(51) Int. Cl.
*H02M 3/158* (2006.01)
*H02M 3/00* (2006.01)
*H02M 3/335* (2006.01)
*H02M 1/00* (2006.01)

(52) U.S. Cl.
CPC ......... *H02M 3/335* (2013.01); *H02M 1/0003* (2021.05); *H02M 1/0074* (2021.05); *H02M 1/0095* (2021.05); *H02M 3/01* (2021.05); *H02M 3/1584* (2013.01); *H02M 3/33571* (2021.05)

(58) Field of Classification Search
CPC ............. H02M 1/0003; H02M 1/0009; H02M 1/0025; H02M 1/0032; H02M 1/0048; H02M 1/0058; H02M 1/0067; H02M 1/007; H02M 1/0074; H02M 1/0077; H02M 1/088; H02M 1/32; H02M 1/4241; H02M 3/01; H02M 3/335; H02M 3/33507; H02M 3/33571; H02M 3/33569; H02M 3/33538; H02M 3/33576; H02M 3/337; H02M 3/1584
See application file for complete search history.

(56) References Cited

U.S. PATENT DOCUMENTS

| | | | | |
|---|---|---|---|---|
| 10,608,539 | B1 * | 3/2020 | Huang | H02J 1/102 |
| 2017/0282728 | A1 * | 10/2017 | Jeon | B60K 6/28 |
| 2020/0350827 | A1 * | 11/2020 | Ahmed | H02M 3/33573 |
| 2021/0376732 | A1 * | 12/2021 | Zhang | H02M 3/1584 |

OTHER PUBLICATIONS

Mohamed H. Ahmed; Chao Fei; Virginia Li; Fred C. Lee; Qiang Li; "Startup and control of high efficiency 48/1V sigma converter"; Nov. 7, 2017; IEEE; 2017 IEEE Energy Conversion Congress and Exposition (ECCE); pp. 2010-2016 (Year: 2017).*

(Continued)

*Primary Examiner* — Thienvu V Tran
*Assistant Examiner* — Shahzeb K Ahmad
(74) *Attorney, Agent, or Firm* — Armstrong Teasdale LLP (57) ABSTRACT

A device for load line regulation of a sigma convert is provided. The device comprises a sigma converter comprising an inductor inductor capacitor (LLC) circuit and a buck converter. The device also comprises control circuitry for the sigma converter. The control circuitry is configured to receive a plurality of electrical measurements associated with the sigma converter; determine, based on the plurality of electrical measurements, an adjusted electrical characteristic for load line regulation of the sigma converter; and provide, based on the adjusted electrical characteristic, gating signals to the buck converter to perform the load line regulation of the sigma converter.

20 Claims, 7 Drawing Sheets

(56) References Cited

OTHER PUBLICATIONS

Fuchun Zhang; Yundong Ma; Huijun Lu; Ruijia Cai; Zhiqiang Zhao; "Research on Current Sharing Method of Two-phase Parallel Sigma Converter"; Jul. 13, 2021; IEEE; 2021 IEEE 12th Energy Conversion Congress & Exposition—Asia (ECCE-Asia); pp. 379-384 (Year: 2021).*

Redl et al., "Optimizing the Load Transient Response of the Buck Converter," *Thirteenth Annual Applied Power Electronics Conference and Exposition (APEC'98)*, 1: 170-176 (Feb. 15-19, 1998).

Yao et al., "Design Considerations for VRM Transient Response Based on the Output Impedance," *IEEE Transactions on Power Electronics*, 18(6): 1270-1277 (Nov. 2003).

\* cited by examiner

FIG. 1

PRIOR ART

SYSTEMS AND METHODS FOR LOAD LINE REGULATION OF SIGMA CONVERTERS

FIELD

The present disclosure relates to a control scheme for achieving load line regulation for a sigma converter (e.g., a device with a buck converter as well as for an inductor inductor capacitor (LLC) circuit, and for point-of load applications that use accurate voltage control.

BACKGROUND

Point-of-load (POL) converters for central processing units (CPUs) or graphics processing units (GPUs) typically have an adaptive voltage positioning (AVP) function for load line regulation, which maintains a constant output resistance under different loadings. For conventional POL based on a buck converter, the AVP is integrated into the control application-specific integrated circuits (ASICs). However, for a sigma converter (e.g., a device with a buck converter as well as an LLC circuit), there is currently no control circuit, such as a digital controller or discrete controllers (e.g., a dedicated controller for the Buck converter and a second dedicated controller for the LLC circuit), that is capable of load line regulation that takes into account the interactions between buck converter with the LLC circuit as well as perform load line regulation.

SUMMARY

A first aspect of the present disclosure provides a device for load line regulation of a sigma converter, comprising: a sigma converter comprising an inductor inductor capacitor (LLC) circuit and a buck converter; and control circuitry for the sigma converter, wherein the control circuitry is configured to: receive a plurality of electrical measurements associated with the sigma converter; determine, based on the plurality of electrical measurements, an adjusted electrical characteristic for load line regulation of the sigma converter; and provide, based on the adjusted electrical characteristic, gating signals to the buck converter to perform the load line regulation of the sigma converter.

According to an implementation of the first aspect, the control circuitry comprises: load line regulation circuitry, wherein the load line regulation circuitry is configured to receive a first set of electrical measurements from the plurality of electrical measurements; determine the adjusted electrical characteristic; and provide the adjusted electrical characteristic to a buck controller.

According to an implementation of the first aspect, the control circuitry further comprises: receive the adjusted electrical characteristic from the load line regulation circuitry; and provide the gating signals to the buck converter based on the adjusted electrical characteristic and one or more electrical measurements from the plurality of electrical measurements.

According to an implementation of the first aspect, the control circuitry further comprises: an LLC controller configured to control the LLC circuit.

According to an implementation of the first aspect, the first set of electrical measurements comprises an input voltage of the sigma converter, a buck voltage associated with the buck converter, and a buck current associated with the buck converter, and wherein the load line regulation circuitry is configured to determine the adjusted electrical characteristic based on the input voltage, the buck voltage, and the buck current.

According to an implementation of the first aspect, the adjusted electrical characteristic is an adjusted current.

According to an implementation of the first aspect, the buck controller is further configured to: determine the gating signals for the buck converter based on the adjusted current, the buck voltage, and an output voltage of the sigma converter.

According to an implementation of the first aspect, the first set of electrical measurements comprises an input voltage of the sigma converter, a buck voltage associated with the buck converter, a buck current associated with the buck converter, and an output voltage of the sigma converter, and wherein the load line regulation circuitry is configured to determine the adjusted electrical characteristic based on the input voltage, the buck voltage, the buck current, and the output voltage.

According to an implementation of the first aspect, the adjusted electrical characteristic is an adjusted voltage.

According to an implementation of the first aspect, the buck controller is further configured to: determine the gating signals for the buck converter based on the adjusted voltage, the buck voltage, and the buck current.

A second aspect of the present disclosure provides a control circuitry for a sigma converter, wherein the control circuitry comprises: a load line regulation circuitry configured to: receive a first set of electrical measurements associated with the sigma converter; determine, based on the first set of electrical measurements, an adjusted electrical characteristic for load line regulation of the sigma converter; and provide the adjusted electrical characteristic to a buck controller; and the buck controller configured to: receive the adjusted electrical characteristic from the load line regulation circuitry; and provide, based on the adjusted electrical characteristic, gating signals to a buck converter of the sigma converter to perform the load line regulation of the sigma converter, wherein the sigma converter comprises the buck converter and an inductor inductor capacitor (LLC) circuit.

According to an implementation of the second aspect, the buck controller is configured to provide the gating signals to the buck converter based on the adjusted electrical characteristic and one or more additional electrical measurements associated with the sigma converter.

According to an implementation of the second aspect, the control circuitry further comprises an LLC controller configured to control the LLC circuit.

According to an implementation of the second aspect, the first set of electrical measurements comprises an input voltage of the sigma converter, a buck voltage associated with the buck converter, and a buck current associated with the buck converter, and the load line regulation circuitry is configured to determine the adjusted electrical characteristic based on the input voltage, the buck voltage, and the buck current.

According to an implementation of the second aspect, the adjusted electrical characteristic is an adjusted current.

According to an implementation of the second aspect, the one or more additional electrical measurements comprise the buck voltage, and an output voltage of the sigma converter, and wherein the buck controller is configured determine the gating signals for the buck converter based on the adjusted current, the buck voltage, and the output voltage of the sigma converter.

According to an implementation of the second aspect, the first set of electrical measurements comprises an input voltage of the sigma converter, a buck voltage associated with the buck converter, a buck current associated with the buck converter, and an output voltage of the sigma converter, and the load line regulation circuitry is configured to determine the adjusted electrical characteristic based on the input voltage, the buck voltage, the buck current, and the output voltage.

According to an implementation of the second aspect, the adjusted electrical characteristic is an adjusted voltage.

According to an implementation of the second aspect, the one or more additional electrical measurements comprise the buck voltage and the buck current, and wherein the buck controller is configured to determine the gating signals for the buck converter based on the adjusted voltage, the buck voltage, and the buck current.

A third aspect of the present disclosure provides a method for load line regulation of a sigma converter, comprising: receiving, by control circuitry for the sigma converter, a plurality of electrical measurements associated with the sigma converter, wherein the sigma converter comprises an inductor inductor capacitor (LLC) circuit and a buck converter; determining, based on the plurality of electrical measurements, an adjusted electrical characteristic for load line regulation of the sigma converter; and providing, based on the adjusted electrical characteristic, gating signals to the buck converter to perform the load line regulation of the sigma converter.

BRIEF DESCRIPTION OF THE DRAWINGS

Embodiments of the present disclosure will be described in even greater detail below based on the exemplary figures. The present disclosure is not limited to the exemplary embodiments. All features described and/or illustrated herein can be used alone or combined in different combinations in embodiments of the present disclosure. The features and advantages of various embodiments of the present disclosure will become apparent by reading the following detailed description with reference to the attached drawings which illustrate the following.

DETAILED DESCRIPTION

The present application provides a method to realize AVP in sigma converter with a discrete control scheme. In particular, sigma converters do not have an existing scheme to achieve load line regulation. Load line regulation is the ability of a converter (e.g., the sigma converter) to maintain a constant output impedance given changes in the load current. In other words, for load line regulation, the converter maintains the system output impedance (RLL or Zref) to a constant output. The output voltage (Vo) is equal to the reference voltage (Vref) minus the output current (Io) multiplied by the system output impedance (RLL) (e.g., Vo=Vref−Io*RLL).

Figure 1:
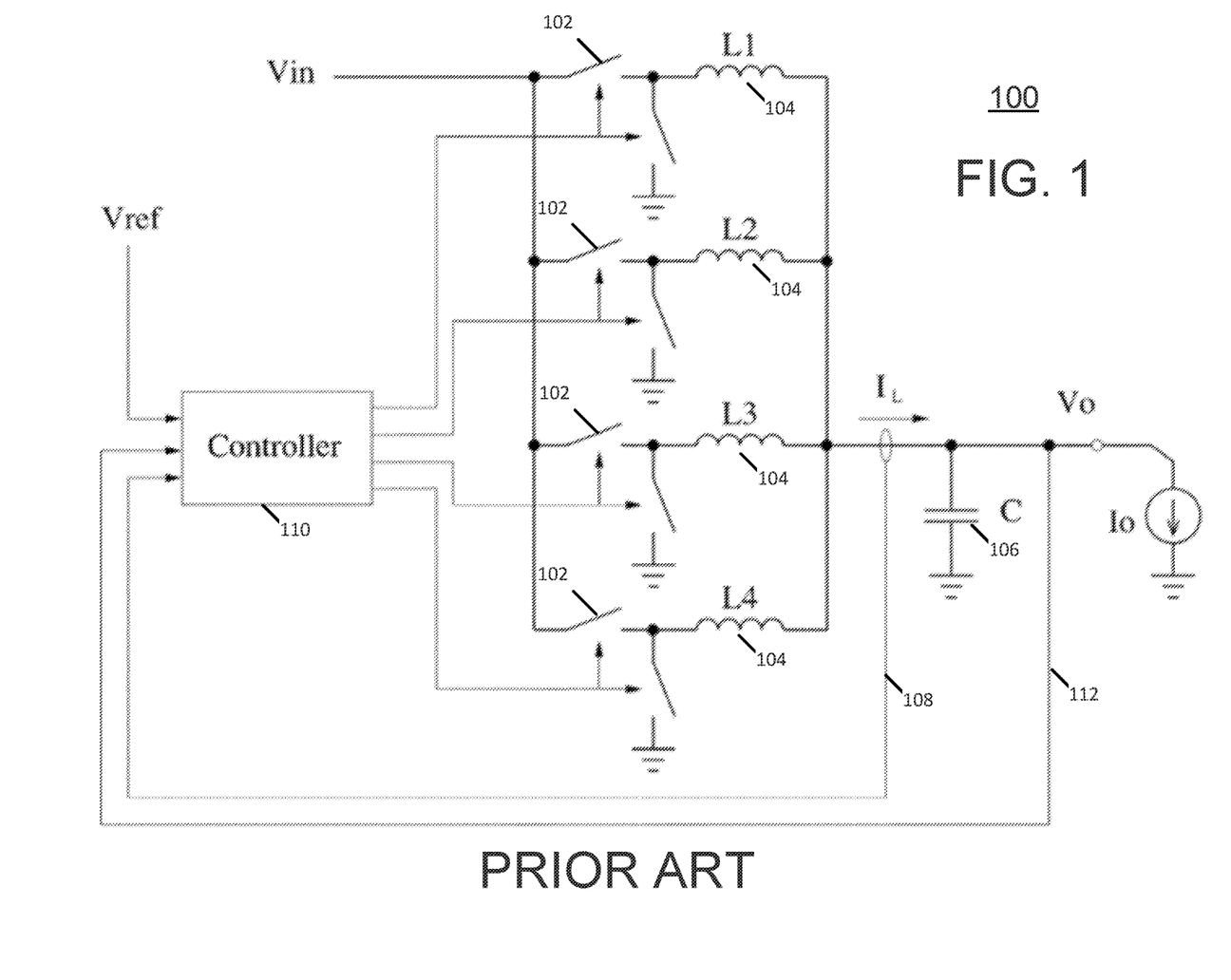
FIG. 1 illustrates a traditional circuit for AVP for a buck converter.

Traditionally, buck converters and LLC circuits have been implemented and controlled separately. FIG. 1 illustrates a traditional circuit for AVP for a buck converter. In particular, FIG. 1 shows a controller with a buck converter. For the buck converter, the input voltage (Vin) is fed to the buck converter, which includes switches 102 and inductors 104 (L1-L4). The output of the buck converter includes a capacitor 106, and the output voltage (Vo) and output current (Io and IL) 108 are fed back into the controller 110. The controller receives the output voltage 112 and output current 108 as well as a reference voltage (Vref). In operation, the buck output current 108 and voltage 112 are sensed and fed back to the controller 110. The controller 110 performs closed loop regulation to achieve a desired output impedance (Zref). In other words, the output voltage (Vo) equals the reference voltage (Vref) minus the output current (Io) multiplied by the output impedance (Zref). The output impedance Zref is also the system's output impedance $R_{LL}$. To put it another way, the equation that is solved by the controller 110 is Vo=Vref−Io*Zref. Some implementation methods for this feedback include schemes based on feedback current-mode control and schemes based on feedback voltage-mode control with load current injection.

In other words, traditionally, the LLC may operate at a fixed frequency and while there may be minimal interference between the LLC and buck controllers in such an instance, the load line regulation may still be an issue since the load line regulation is calculated from the current measurement. For existing buck controllers, the current measurement that is used is the buck current, and not the sigma output current (Io), which may be different from the buck current. Without knowing the full load current (e.g., the sigma output current Io), load line regulation is not achieved using the traditional methods (e.g., using a traditional digital or discrete controllers).

As such, in some instances, the present disclosure reconstructs the full load current information by adding additional signals either in the voltage or current feedback loop such that the buck controller has the desired output voltage regulation. As will be described below, the present disclosure may perform load line regulation of the sigma converter using a pure digital controller or discrete controllers. Using the discrete controllers have the advantage of having faster transient response by taking the advantage of the existing buck ASIC control chip. With a digital controller, the interfaces and coding the required control algorithm are configured such that there is almost no limitation for implementation. However, the digital controller requires signal digitalization, central processing unit (CPU) operation and result output, which may require time to execute, introducing delays and degrading the control performance. To put it another way, the present disclosure may be implemented either in digital or in analog. Analog (discrete controllers) may account for a faster dynamic, but might use a dividing chip, which has limited availability. Digital controllers do not have this limitation, but may introduce delays. Also, unlike a traditional digital controller, the present disclosure's control circuit does not have a significant impact on the system dynamic, since the system dynamic may be mainly on the Buck controller (e.g., the Buck ASIC). This will be described in further detail below.

In particular, exemplary aspects of performing load line regulation for a sigma converter, according to the present disclosure, are further elucidated below in connection with exemplary embodiments, as depicted in the figures. The exemplary embodiments illustrate some implementations of the present disclosure and are not intended to limit the scope of the present disclosure.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

Where possible, any terms expressed in the singular form herein are meant to also include the plural form and vice versa, unless explicitly stated otherwise. Also, as used herein, the term "a" and/or "an" shall mean "one or more" even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on".

Figure 2:
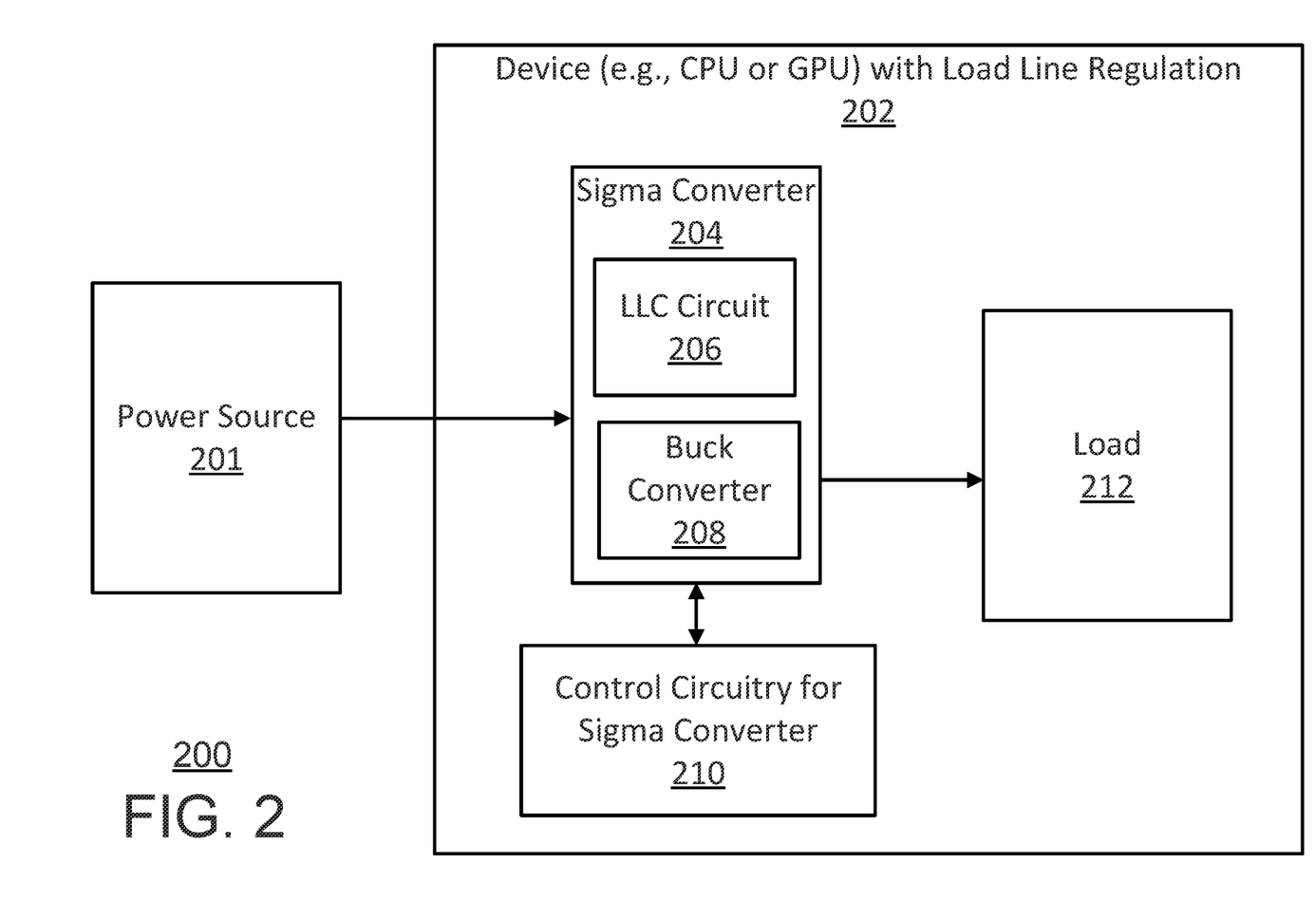
FIG. 2 is a block diagram depicting an exemplary system with a sigma converter and control circuitry for the sigma converter according to one or more embodiments of the present disclosure.

FIG. 2 is a block diagram depicting an exemplary system with a sigma converter and control circuitry for the sigma converter according to one or more embodiments of the present disclosure. In particular, the system 200 includes a device 202 (e.g., a CPU or GPU) that performs load line regulation for a sigma converter 204. The system 200 includes a power source 201 that provides energy to the device 200. For instance, the power source 201 may be configured to provide energy (e.g., power, current, and/or voltage such as DC power, DC current, and/or DC voltage) to the device 202. As shown, the power source 201 is separate from the device 202. In other instances, the power source 201 is included within the device 202 (e.g., the device 202 includes the power source 201).

The device 202 may be any type of computing device that includes a sigma converter for converting voltages. For instance, in some instances, the device 202 may be an integrated circuit such as a CPU or GPU. In other instances, the device 202 may be computing device such as a computer, laptop, desktop, mobile phone, and so on. As such, the device 202 may include additional elements that are not shown in FIG. 2. For instance, the sigma converter 204 may be a point of load (POL) converter for a load 212. There may be one or more other converters between the sigma converter 204 and the power source 201. For instance, the power source 201 may be configured to provide alternating current (AC) power, and another converter may convert the AC power to DC power. The sigma converter 204 may be used to step down the DC power such that the power may be used by the load 212.

The device 202 includes the sigma converter 204, control circuitry for the sigma converter 210, and a load 212. The load 212 may be any type of load that is coupled to the sigma converter 210. For instance, the load 212 may be a CPU or a graphics processing unit (GPU). In other words, the sigma converter 204 may be a POL converter, and the load may be a CPU or GPU.

The sigma converter 204 includes an LLC circuit 206 and a buck converter 208. This will be shown and described in more detail in FIG. 3. The sigma converter 204 is electrically to the control circuitry for the sigma converter 210. The control circuitry 210 receives measurements (e.g., electrical measurements) such as voltage, current, and/or power measurements from the sigma converter 204. The control circuitry 210 uses these measurements to determine an adjusted electrical characteristic for regulating the sigma converter 204 such that load line regulation for the sigma converter 204 is achieved. In other words, the output impedance/resistance that is required is achieved using the adjusted electrical characteristic, such that the output voltage drops linearly with the load current with respect to the voltage command (i.e., Vo=Vref−Io*RLL). Then, using the adjusted electrical characteristic (e.g., an adjusted voltage or an adjusted current that is fed to the buck ASIC), the buck converter is regulated such as by controlling the switches or gates of the buck converter. This will be described in more detail in FIGS. 4-6.

Figure 3:
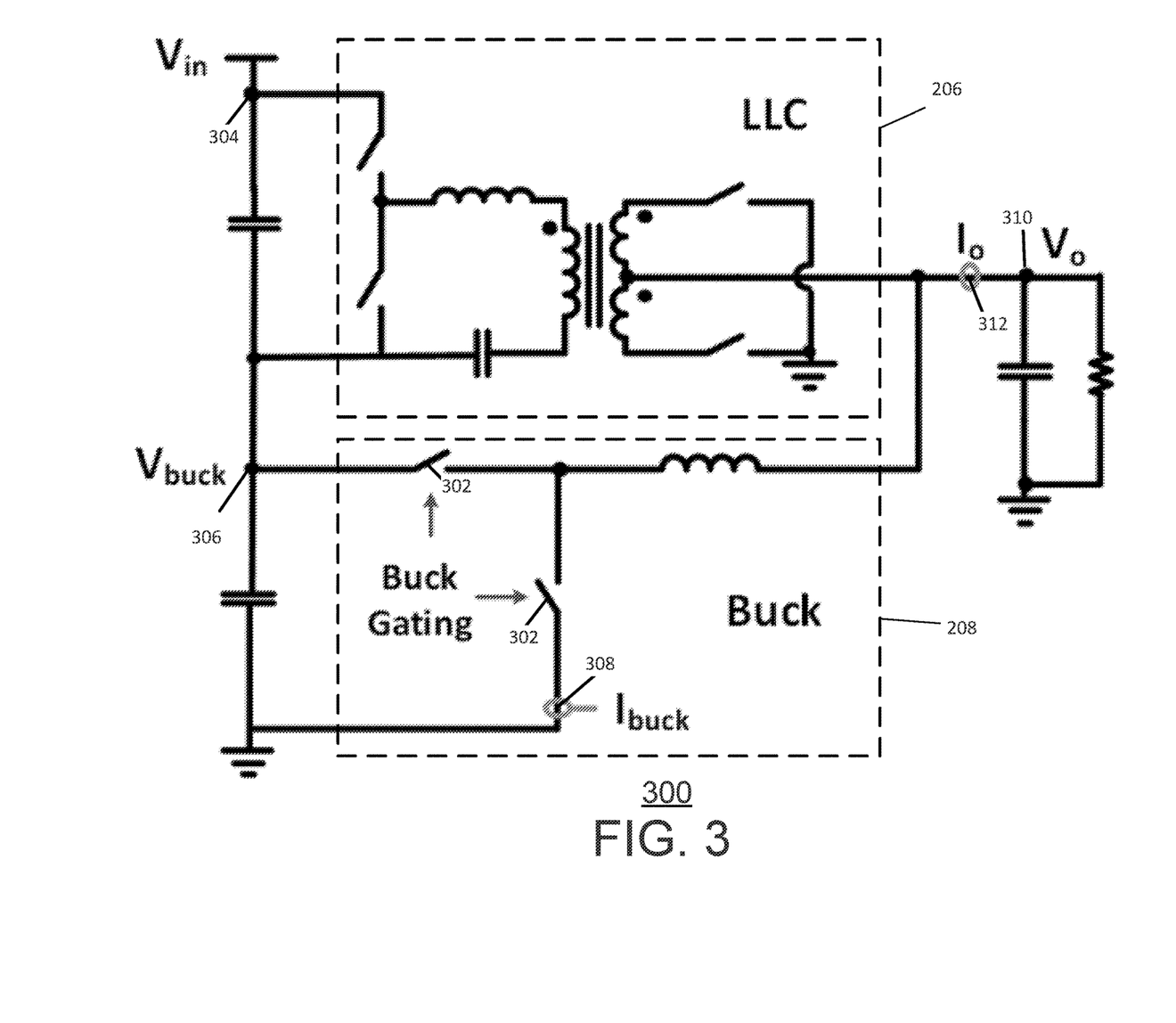
FIG. 3 illustrates the circuit of a sigma converter with an LLC circuit and a buck converter according to one or more embodiments of the present disclosure.

FIG. 3 illustrates the circuit of a sigma converter with an LLC circuit and a buck converter according to one or more embodiments of the present disclosure. In particular, referring to the circuit 300, the dotted lines show LLC circuit 206 and the buck converter 208. The LLC circuit 206 and the buck converter 208 include capacitors, inductors, and gates (e.g., switches) such as the buck gating 302. In addition, certain measurement devices (e.g., sensors) are configured to detect electrical measurements of the circuit 300 and provide the electrical measurements to the control circuitry 210. For instance, one or more measurement devices may be configured to detect the input voltage (Vin) at point 304, the buck voltage (Vbuck) at point 306, the buck current (Ibuck) at point 308, the output voltage (Vo) at point 310, and/or the output current (Io) at point 312. Afterwards, the one or more measurement devices may provide the detected electrical measurements (e.g., the Vin, Vbuck, Ibuck, Vo, and Io) to the control circuitry for the sigma converter 210.

In operation, within a sigma converter (e.g., sigma converter 204), one buck converter 208 and one LLC converter (e.g., the LLC circuit 206) are in input series and output parallel (ISOP) configuration, which is shown in FIG. 3. The buck and LLC converters 206 and 208 are operated coordinately to achieve output voltage regulation and input capacitor's voltage sharing between the buck and LLC converters 206 and 208. In a discrete control scheme, the output voltage (Vo) may be controlled through a buck controller (e.g., a buck ASIC), while the voltage sharing may be controlled through the LLC controller. Due to the wide adoption in POL, the Buck ASIC may include the integrated AVP function that allows the configuration of load line resistance (RLL) per application. In Buck POL, the output current (Io) may be sensed through a shunt in series to the lower device of the power stage and fed to the ASIC for fast transient response control. However, due to the ISOP connection in the sigma converter (e.g., the sigma converter 204), the sensed buck current (Ibuck) may be only a portion of the load current (Io) 312. Therefore, to achieve correct load line regulation for sigma converter, the present disclosure provides the full load current information to the Buck ASIC.

Due to ISOP connection, the power delivered through the LLC 206 and the buck 208 may be proportional to their input capacitor's voltage. As a result, the full load current may be obtained by scaling up the sensed buck current (Io) based on the voltage share of the buck 208 at the input side (e.g., Io=(Vin/Vbuck)*Ibuck, where Vin and Vbuck are the input voltage of the sigma converter 204 and input voltage of the buck (Vbuck) respectively, which is shown as points 304 and 306, and Ibuck is the buck current, which is shown as point 308). This will be described in more detail in FIGS. 4-6.

Figure 4:
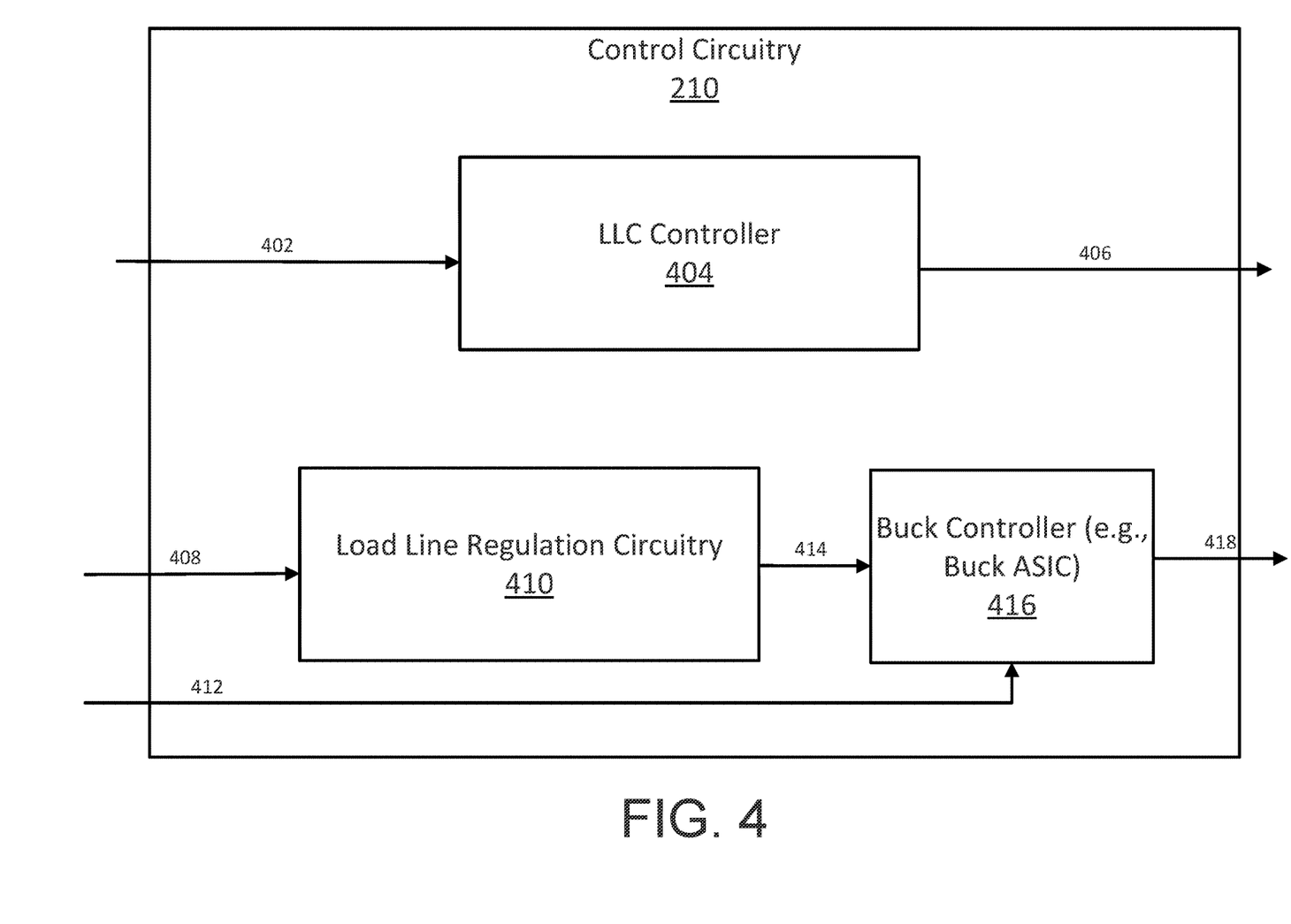
FIG. 4 is a block diagram for the control circuitry for the sigma converter according to one or more embodiments of the present disclosure.

FIG. 4 is a block diagram for the control circuitry for the sigma converter according to one or more embodiments of the present disclosure. In particular, the control circuitry 210 includes an LLC controller 404, a buck controller (e.g., Buck ASIC) 416, and load line regulation circuitry 410. The LLC controller 404 and the buck controller 416 may be any type of controller and is not constrained to any particular hardware. For instance, the controllers 404 and 416 may be formed by a single processor, such as general purpose processor with the corresponding software implementing the described control operations. On the other hand, the controllers may be implemented by a specialized hardware, such as an ASIC (Application-Specific Integrated Circuit), an FPGA (Field-Programmable Gate Array), a DSP (Digital Signal Processor), or the like.

In some variations, the controllers 404 and 416 may be in electrical communication with memory. The memory may be and/or include a computer-usable or computer-readable medium such as, but not limited to, an electronic, magnetic, optical, electromagnetic, infrared, or semiconductor computer-readable medium. More specific examples (e.g., a non-exhaustive list) of the computer-readable medium may include the following: an electrical connection having one or more wires; a tangible medium such as a portable computer diskette, a hard disk, a time-dependent access memory (RAM), a ROM, an erasable programmable read-only memory (EPROM or Flash memory), a compact disc read-only memory (CD ROM), or other tangible optical or magnetic storage device. The memory may store corresponding software such as computer-readable instructions (code, script, etc.). The computer instructions being such that, when executed by the controller (e.g., the LLC controller 404 and/or the buck controller 416), cause the controller to control the sigma converter 204.

In some instances, the load line regulation circuitry 410 is implemented using circuit elements (e.g., an integrated circuit and/or an analog circuit). In other instances, the load line regulation circuitry 410 is implemented using software instructions executed by a controller or processor such as the buck controller 416 or a separate controller. For instance, the load line regulation circuitry 410 may be implemented with analog circuits (e.g., arithmetic integrated circuits), which may ensure minimum impact to the control performance of the buck controller 416. Additionally, and/or alternatively, a microcontroller, FPGA, or other types of controllers/processors may be used to determine the calculation.

In operation, the load line regulation circuitry 410 receives information 408 such as one or more electrical measurements from the sigma converter 204, generates an adjusted value (e.g., an adjusted current or voltage), and provides information 414 indicating the adjusted value to the buck controller 416. The buck controller 416 receives the information 414 indicating the adjusted values and information 412. The information 412 may include one or more electrical measurements from the sigma converter 204. Using the electrical measurements and the adjusted values, the buck controller 416 determines buck gating signals (e.g., signals for the buck gates/switches 302, which is shown in FIG. 3), and outputs the buck gating signals to the sigma converter 204/the buck converter 208. The LLC controller 404 receives information 402 such as one or more electrical measurements from the sigma converter 204 and provides information 406 to control the LLC circuit 206. The load line regulation circuitry 410 will be described in more detail in FIGS. 5 and 6.

Figure 5:
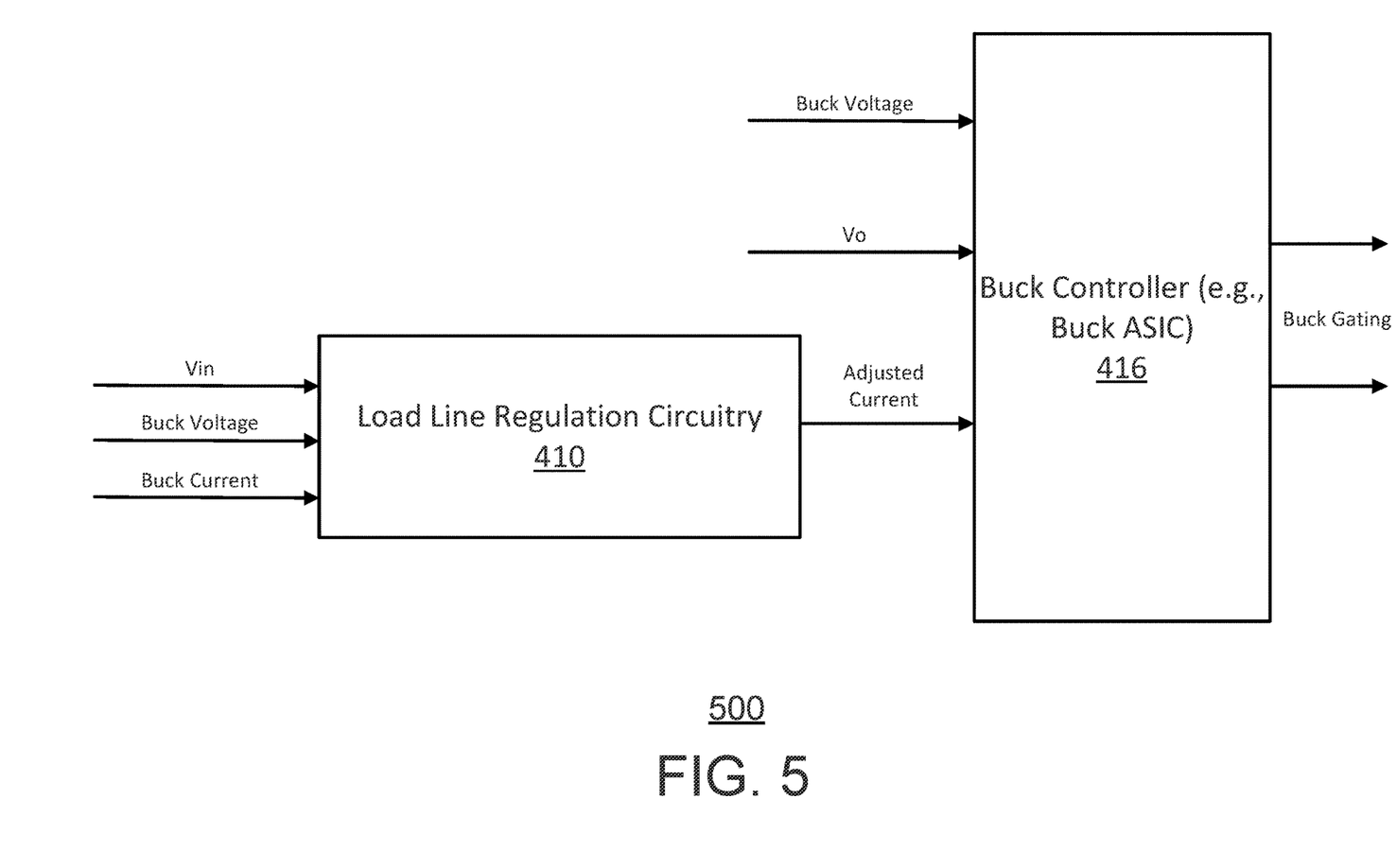
FIG. 5 depicts a block diagram for certain elements within the control circuitry according to one or more embodiments of the present disclosure.

FIG. 5 depicts a block diagram 500 for certain elements within the control circuitry according to one or more embodiments of the present disclosure. In particular, FIG. 5 shows the load line regulation circuitry 410 and the buck controller 416. The load line regulation circuitry 410 receives the input voltage (Vin), the buck voltage (Vbuck), and the buck current (Ibuck) from the sigma converter 204. For instance, referring back to FIG. 3, one or more measurement devices may detect the input voltage at point 304, the buck voltage at point 306, and the buck current at point 308, and provide the detected measurements to the load line regulation circuitry 410. Furthermore, the buck controller 416 (e.g., the buck ASIC) may also receive the buck voltage (Vbuck) and the output voltage (Vo), which is obtained by a measurement device at point 310.

The load line regulation circuitry 410 may generate an adjusted electrical characteristic such as an adjusted current (Io,fb) and feed the adjusted current to the buck controller 416. The buck controller 416 then determines and provides the buck gating signals to the buck gating 302.

In some instances, the load line regulation circuitry 410 generates the adjusted electrical characteristic by modifying the current feedback by scaling up the sensed current (Io,fb). In particular, the load line regulation circuitry 410 may calculate the sensed current Io,fb based on an equation such as $$I_{o,fb} = \frac{V_{in}}{V_{buck}} \frac{R_{LL}}{R_{LL,buck}} I_{buck}.$$

Here, the Vin is the input voltage, Vbuck is the buck voltage, Ibuck is the buck current, RLL is the desired load line resistance, and $R_{LL,buck}$ is the setting in the buck controller 416. In other words, the RLL is specified by the load and the $R_{LL,buck}$ is the setting inside the buck controller. For a single buck, the $R_{LL,buck}$ is the $R_{LL}$. For a sigma converter, the $R_{LL,buck}$ may be selected (e.g., determined by the buck controller 416) to be any reasonable value as long as the $I_{o,fb}$ is satisfied, which means that the $R_{LL,buck}$ might not necessarily be the $R_{LL}$. To put it another way, when $R_{LL,buck}=R_{LL}$, then the equation becomes $$I_{o,fb} = \frac{V_{in}}{V_{buck}} I_{buck}.$$

As such, the load line regulation circuitry 410 may calculate the adjusted current Io,fb and feed the adjusted current to the buck controller 416. By using the adjusted current, the load line regulation circuitry 410 may achieve load line regulation for the sigma converter 204. In other words, the adjusted current ($I_{o,fb}$) is a reconstruction of the actual load current. With the actual load current being fed into the controller, the buck controller may be able to perform load line regulation (e.g., by just using the buck current, which is used by a traditional buck controller, the traditional buck controller might not be able to perform load line regulation). Then, the buck controller 416 determines the buck gating based on the adjusted current, the output voltage, and the buck voltage. For instance, the buck controller 416 may include hardware and/or software configured to determine the buck gating. The output gating may depend on the feedback signals. In other words, by using the adjusted current, the buck controller 416 may generate the output voltage reference, and have voltage and current control loops to regulate. The regulator output is compared with a sawtooth signal, which generates the gating for the buck.

Figure 6:
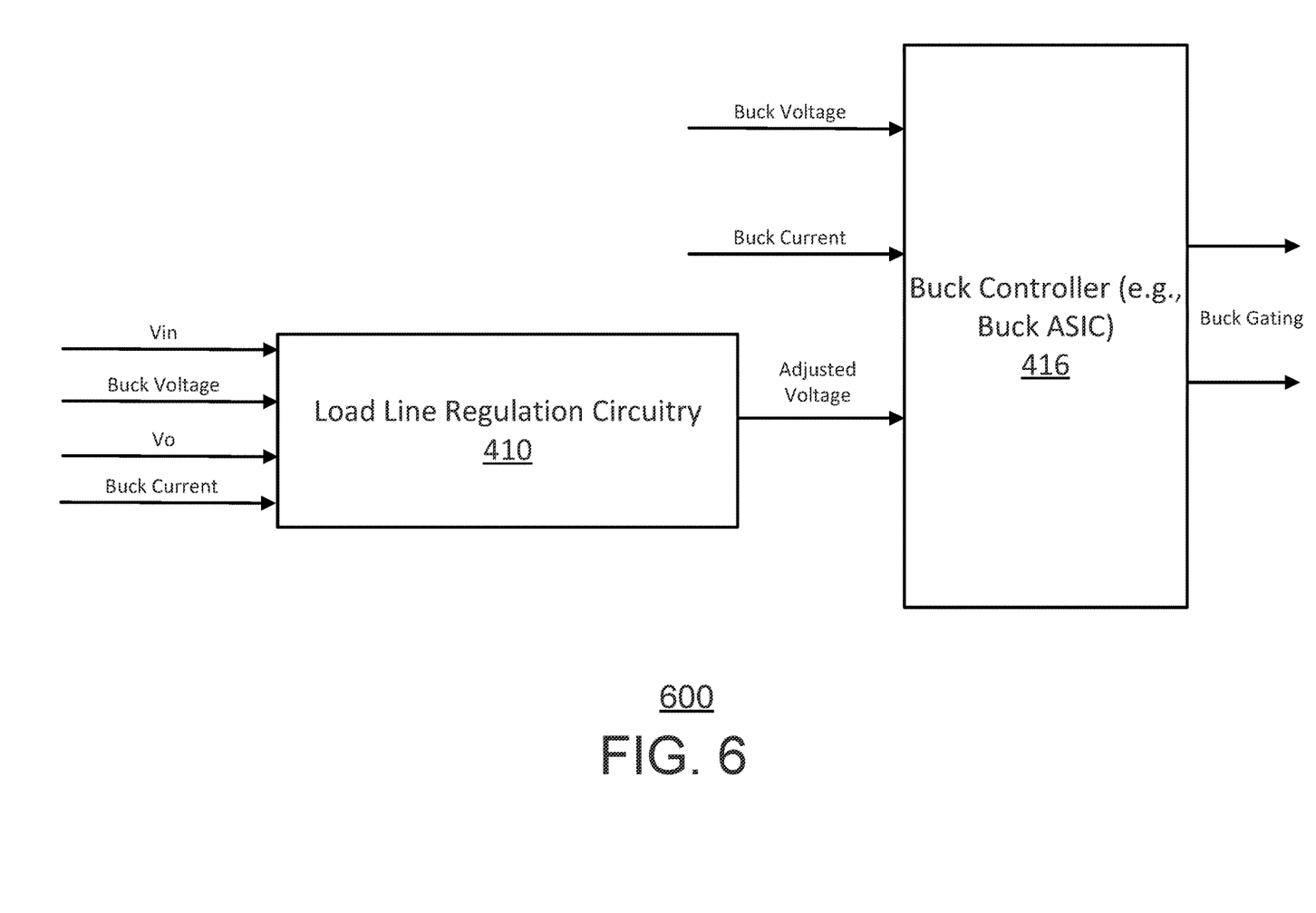
FIG. 6 depicts another block diagram for certain elements within the control circuitry according to one or more embodiments of the present disclosure.

FIG. 6 depicts another block diagram 600 for certain elements within the control circuitry according to one or more embodiments of the present disclosure. In particular, FIG. 6 shows another embodiment for achieving load line regulation for the sigma converter 204. The load line regulation circuitry 410 receives the input voltage (Vin), the buck voltage (Vbuck), the output voltage (Vo), and the buck current (Ibuck) from the sigma converter 204. For instance, referring back to FIG. 3, one or more measurement devices may detect the input voltage at point 304, the buck voltage at point 306, the output voltage at point 310, and the buck current at point 308, and provide the detected measurements to the load line regulation circuitry 410. Furthermore, the buck controller 416 (e.g., the buck ASIC) may also receive the buck voltage (Vbuck) and the buck current (Ibuck).

The load line regulation circuitry 410 may generate an adjusted electrical characteristic such as an adjusted voltage ($\Delta$Vo,fb) and feed the adjusted voltage to the buck controller 416. The buck controller 416 then determines and provides the buck gating signals to the buck gating 302. This is described above. To put it another way, the controller 416 acts on the voltage and current sensed at the pin (e.g., at Io and Vo 310 and 312) to determine the buck gating signals.

In other words, the embodiment shown in FIG. 6 adds (e.g., determines) an additional change in voltage ($\Delta$V) to compensate for the impact from the LLC circuit 206. As such, the load line regulation circuitry 410 may calculate the adjusted voltage by the equation:

$$\Delta V_{o,fb} = \left(\frac{V_{in}}{V_{buck}} R_{LL} - R_{LL,buck}\right) I_{buck}.$$

When $R_{LL,buck} = R_{LL}$, then the equation becomes $$\Delta V_{o,fb} = \frac{V_{in} - V_{buck}}{V_{buck}} R_{LL} I_{buck}.$$

After calculating the adjusted voltage, this value is fed into the buck controller 416 along with the buck voltage and the buck current. Then, using these inputs, the buck controller 416 determines the buck gating.

By using the embodiment shown in FIG. 6, it injects additional signals to the original voltage feedback, which has slower dynamics compared to the current loop. This may reduce the impact of the current loop operation when the current ripple is used by the buck controller 416 for fast response control.

As mentioned previously, the embodiments described in FIGS. 5 and 6, and in particular, the load line regulation circuitry 410 may be implemented using hardware and/or software. For instance, circuits such as analog circuits may be used for performing the calculated equations (e.g., there may be multiplication, division, addition, and/or subtraction chips/circuits used to implement the equations described above). The analog circuits may be implemented in multiple different ways. For instance, in some variations, the analog circuit may use a discrete multiplier, divider, and amplifier. In another variation, the divider and/or the whole calculation components may be implemented in a digital controller (e.g., partially analog and partially digital). Additionally, and/or alternatively, the load line regulation circuitry 410 may be implemented as software code that is stored in memory, and a controller or processor, when executing the software code, may determine the adjusted values (e.g., a pure digital controller that performs the above functionality).

In some examples, the control circuitry 210 may include separate elements or controllers for each of the LLC controller 404, the load line regulation circuitry 410, and the buck controller 416. In other examples, a single controller may implement the functionalities of the LLC controller 404, the load line regulation circuitry 410, and/or the buck controller 416. For instance, a single controller may perform the functionalities of both the load line regulation circuitry 410 as well as the buck controller 416.

Figure 7:
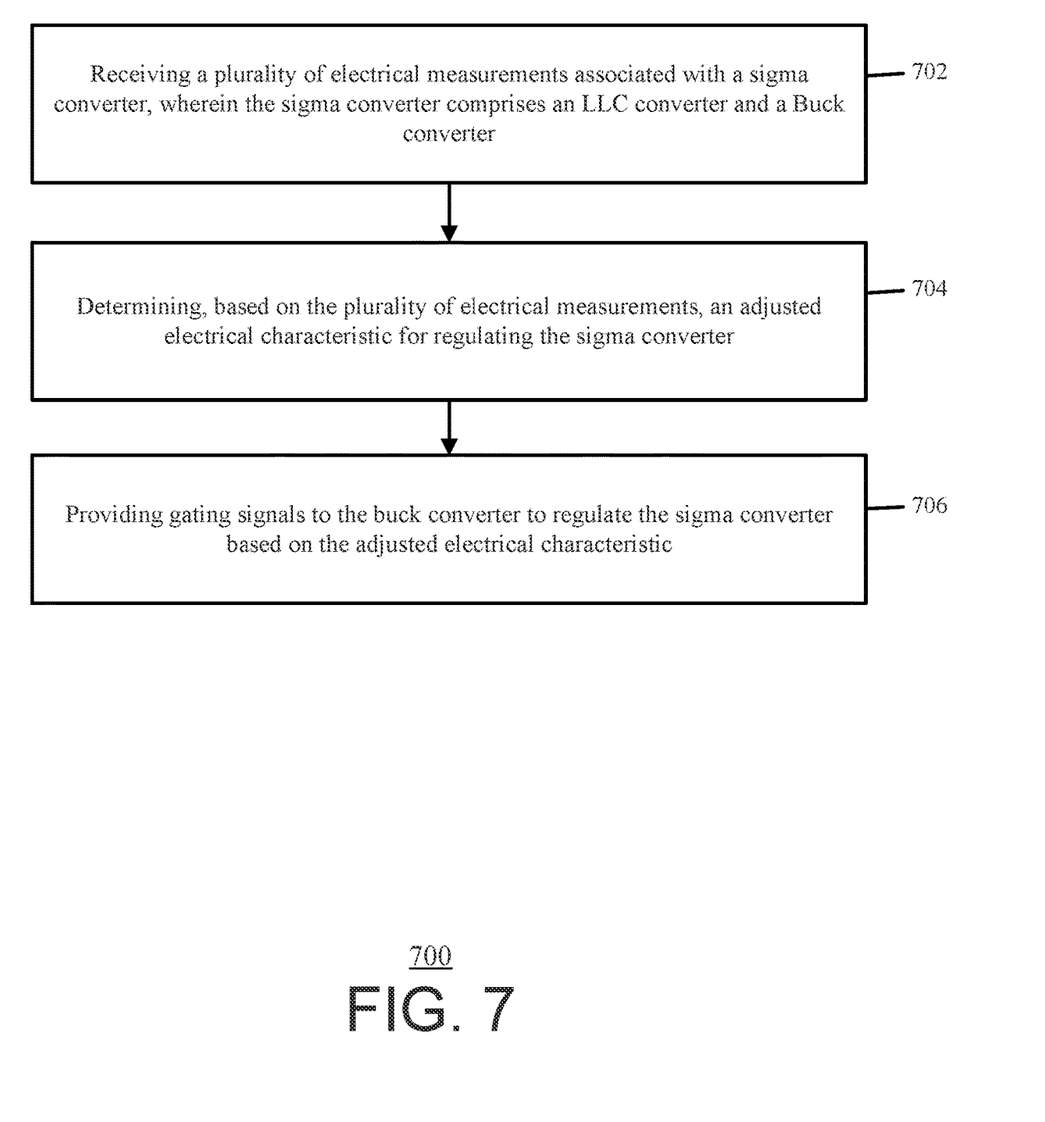
FIG. 7 depicts an exemplary process for load line regulation of the sigma converter according to one or more embodiments of the present disclosure.

FIG. 7 depicts an exemplary process for load line regulation of the sigma converter according to one or more embodiments of the present disclosure.

At block 702, the control circuitry 210 for the sigma converter is configured to receive a plurality of electrical measurements associated with a sigma converter 204. The electrical measurements include the input voltage, the buck voltage, the buck current, the output current, and/or additional measurements. The sigma converter 204 includes a buck converter 208 and an LLC circuit 206.

At block 704, the control circuitry 210 (e.g., the load line regulation circuitry 410) is configured to determine an adjusted electrical characteristic for regulating the sigma converter based on the plurality of electrical measurements.

At block 706, the control circuitry 210 is configured to provide gating signals to the buck converter to regulate the sigma converter based on the adjusted electrical characteristic. For instance, the load line regulation circuitry 410 may provide an adjusted current or an adjusted voltage to the buck controller 416 such as a buck ASIC. The buck controller may use the adjusted current and/or the adjusted voltage, along with other electrical measurements from the sigma converter 204, to determine buck gating signals to control the buck converter 208.

As such, the present disclosure describes a system and method to realize load line regulation of a sigma converter. To realize load line regulation for an ISOP configured converter such as the sigma converter, in some examples, the present disclosure modifies the current feedback by scaling up or adding additional signals such that the power delivery through the other converter is compensated for load line regulation. In some instances, the present disclosure modifies the current feedback by scaling up or adding additional signals into the output voltage control loop to compensate the impact from the paralleled other converter. In some variations, the present disclosure generates the additional feedback based on the power sharing of the converter controlling the output voltage and the other converter that is paralleled.

While embodiments of the invention have been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. For example, the various embodiments of the kinematic, control, electrical, mounting, and user interface subsystems can be used interchangeably without departing from the scope of the invention. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A device for load line regulation of a sigma converter, comprising:
   a sigma converter comprising an inductor inductor capacitor (LLC) circuit and a buck converter; and
   control circuitry for the sigma converter, wherein the control circuitry is configured to:
      receive a plurality of electrical measurements associated with the sigma converter, wherein the plurality of electrical measurements comprise a buck current associated with the buck converter;
      calculate an output current of the sigma converter based on the buck current;
      determine, based on the plurality of electrical measurements and the calculated output current of the sigma converter, an adjusted electrical characteristic for load line regulation of the sigma converter; and
      provide, based on the adjusted electrical characteristic, gating signals to the buck converter to perform the load line regulation of the sigma converter.

2. The device of claim 1, wherein the control circuitry comprises:
   load line regulation circuitry, wherein the load line regulation circuitry is configured to:
      receive a first set of electrical measurements from the plurality of electrical measurements, wherein the first set of electrical measurements comprises the buck current associated with the buck converter;
      determine, based on the first set of electrical measurements and the calculated output current of the sigma converter, the adjusted electrical characteristic; and
      provide the adjusted electrical characteristic to a buck controller.

3. The device of claim 2, wherein the control circuitry further comprises:
   the buck controller, wherein the buck controller is configured to:
      receive the adjusted electrical characteristic from the load line regulation circuitry; and
      provide the gating signals to the buck converter based on the adjusted electrical characteristic and one or more electrical measurements from the plurality of electrical measurements.

4. The device of claim 3, wherein the control circuitry further comprises:
   an LLC controller configured to control the LLC circuit.

5. The device of claim 3, wherein the first set of electrical measurements comprises an input voltage of the sigma converter, a buck voltage associated with the buck converter, and the buck current associated with the buck converter, and
   wherein the load line regulation circuitry is configured to determine the adjusted electrical characteristic based on the input voltage, the buck voltage, and the buck current.

6. The device of claim 5, wherein the adjusted electrical characteristic is an adjusted current based on the calculated output current of the sigma converter.

7. The device of claim 6, wherein the buck controller is further configured to:
   determine the gating signals for the buck converter based on the adjusted current, the buck voltage, and an output voltage of the sigma converter.

8. The device of claim 3, wherein the first set of electrical measurements comprises an input voltage of the sigma converter, a buck voltage associated with the buck converter, the buck current associated with the buck converter, and an output voltage of the sigma converter, and
   wherein the load line regulation circuitry is configured to determine the adjusted electrical characteristic based on the input voltage, the buck voltage, the buck current, and the output voltage.

9. The device of claim 8, wherein the adjusted electrical characteristic is an adjusted voltage.

10. The device of claim 9, wherein the buck controller is further configured to:
    determine the gating signals for the buck converter based on the adjusted voltage, the buck voltage, and the buck current.

11. A control circuitry for a sigma converter, wherein the control circuitry comprises:
    a load line regulation circuitry configured to:
    receive a first set of electrical measurements associated with the sigma converter wherein the first set of electrical measurements comprise a buck current associated with the buck converter;
    calculate an output current of the sigma converter based on the buck current;
    determine, based on the first set of electrical measurements and the calculated output current of the sigma converter, an adjusted electrical characteristic for load line regulation of the sigma converter; and
    provide the adjusted electrical characteristic to a buck controller; and
    the buck controller configured to:
    receive the adjusted electrical characteristic from the load line regulation circuitry; and
    provide, based on the adjusted electrical characteristic, gating signals to a buck converter of the sigma converter to perform the load line regulation of the sigma converter, wherein the sigma converter comprises the buck converter and an inductor inductor capacitor (LLC) circuit.

12. The control circuitry of claim 11, wherein the buck controller is configured to provide the gating signals to the buck converter based on the adjusted electrical characteristic and one or more additional electrical measurements associated with the sigma converter.

13. The control circuitry of claim 12, further comprising:
    an LLC controller configured to control the LLC circuit.

14. The control circuitry of claim 12, wherein the first set of electrical measurements comprises an input voltage of the sigma converter, a buck voltage associated with the buck converter, and the buck current associated with the buck converter, and wherein the load line regulation circuitry is configured to determine the adjusted electrical characteristic based on the input voltage, the buck voltage, and the buck current.

15. The control circuitry of claim 14, wherein the adjusted electrical characteristic is an adjusted current based on the calculated output current of the sigma converter.

16. The control circuitry of claim 15, wherein the one or more additional electrical measurements comprise the buck voltage, and an output voltage of the sigma converter, and wherein the buck controller is configured determine the gating signals for the buck converter based on the adjusted current, the buck voltage, and the output voltage of the sigma converter.

17. The control circuitry of claim 12, wherein the first set of electrical measurements comprises an input voltage of the sigma converter, a buck voltage associated with the buck converter, the buck current associated with the buck converter, and an output voltage of the sigma converter, and wherein the load line regulation circuitry is configured to determine the adjusted electrical characteristic based on the input voltage, the buck voltage, the buck current, and the output voltage.

18. The control circuitry of claim 17, wherein the adjusted electrical characteristic is an adjusted voltage.

19. The control circuitry of claim 18, wherein the one or more additional electrical measurements comprise the buck voltage and the buck current, and wherein the buck controller is configured to determine the gating signals for the buck converter based on the adjusted voltage, the buck voltage, and the buck current.

20. A method for load line regulation of a sigma converter, comprising:

receiving, by control circuitry for the sigma converter, a plurality of electrical measurements associated with the sigma converter, wherein the sigma converter comprises an inductor inductor capacitor (LLC) circuit and a buck converter, and wherein the plurality of electrical measurements comprise a buck current associated with the buck converter;

calculate an output current of the sigma converter based on the buck current;

determining, based on the plurality of electrical measurements and the calculated output current of the sigma converter, an adjusted electrical characteristic for load line regulation of the sigma converter; and providing, based on the adjusted electrical characteristic, gating signals to the buck converter to perform the load line regulation of the sigma converter.

* * * * *